# 3,057,409
WELL CASING
George J. Grossman, Jr., Houston, Tex., assignor to Texaco Inc., a corporation of Delaware
Filed Dec. 31, 1958, Ser. No. 784,238
6 Claims. (Cl. 166—242)

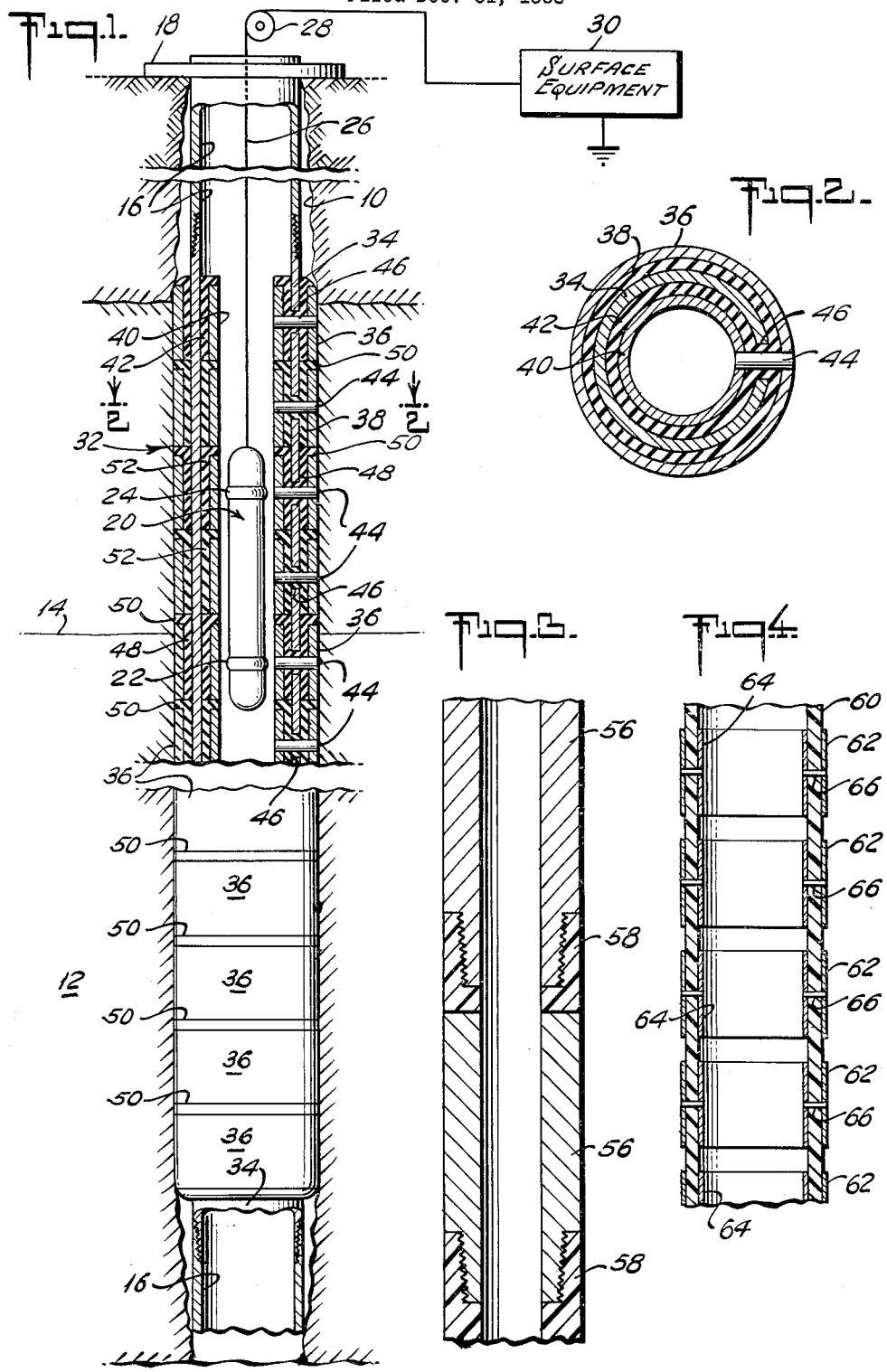

This invention relates to well casings and more particularly to well or borehole casings through which an electrical log of the subsurface formations may be obtained.

It is well known that natural-gamma logs and neutron-gamma logs can be obtained through well casings, however, heretofore reliable resistivity or self-potential logs of subsurface formations traversed by a borehole having a casing set therein have not been obtained. Frequently it is desirable to obtain an electric log of a formation years after the borehole or well has been completed, for example, to determine changes, if any, in the formation resistivity after the casing has been set. If resistivity logs could be produced through a well casing the oil-water contact of a reservoir could be monitored throughout the life of a field. This would give reservoir engineers valuable additional information to calculate the amount of fluid in place and consequently a better evaluation of the field.

In accordance with this invention, a well casing is provided which is substantially electrically invisible so as to not appreciably distort current flow lines and equipotential lines in the vicinity of a borehole.

In the practice of one embodiment of this invention conductive inner and outer rings are electrically interconnected and disposed around and within, respectively, an electrically conductive casing and insulated therefrom. The electrical interconnection may be provided by drilling a hole through the rings, the casing and the layer of insulation between the casing and each of the rings and a rivet inserted therein so as to electrically contact the two rings without contacting the conductive casing. A plurality of these ring arrangements are longitudinally spaced at predetermined intervals and insulated from each other to make up a casing joint of any desired length, for example, 30 feet.

In the practice of a second embodiment of this invention, the casing may be fabricated of alternate longitudinally spaced cylinders of a tough plastic insulation material and of electrically conductive material, respectively.

For a better understanding of the invention, reference may be had to the accompanying drawing in which:

FIG. 1 is a vertical elevational view through a borehole showing the well casing of the present invention set therein.

FIG. 2 is a cross-sectional view of the casing shown in FIG. 1.

FIG. 3 illustrates a portion of a casing in accordance with another embodiment of this invention, and FIG. 4 illustrates a portion of the casing of still another embodiment of the present invention.

Referring to the drawing and particularly to FIG. 1 there is shown a borehole 10 traversing a plurality of subsurface formations including a producing formation 12 wherein there is shown an oil-water contact or interface 14. The borehole 10 is lined with a casing 16 having a casing head 18. Suspended within the casing 16 is an electrical logging exploring unit 20 having a current electrode 22 and a potential electrode 24 at the external surface thereof which is insulated from the housing of the exploring unit 20. The exploring unit 20 is suspended within the borehole by means of a cable 26 having electrical conductors therein which engages at the surface a suitable cable-measuring device 28 which is adapted to measure continuously the length of cable payed out and thus the depth of the exploring unit 20. The cable 26 is electrically connected at one end to the exploring unit 20 and at the other end to surface equipment 30 which may include a source of electric current connected through the cable 26 to the current electrode 22 and a recording device connected through the cable 26 to the potential electrode 24 of the exploring unit 20.

In accordance with this invention the casing 16 includes at least one casing joint 32 lining the producing formation 12 which includes a tubular member and means for transmitting electrical energy transversely through the member but which means are incapable of transmitting electrical energy longitudinally of the tubular member. More particularly, the casing joint 32 includes an electrically conductive cylinder 34 which may threadedly engage the upper and lower portions of the casing 16. First electrically conductive rings 36 are disposed externally around the conductive cylinder 34 and are insulated therefrom by a first layer of insulation 38. Second electrically conductive rings 40 are disposed concentrically within said conductive cylinder 34 and insulated therefrom by a second layer of insulation 42. Each of the first conductive rings 36 are electrically connected to a corresponding second conductive ring to form a plurality of conductive ring arrangements by means of a rivet 44 which may carry electric energy through the wall of the well casing 16. Each of the rivets 44 are insulated from the conductive cylinder 34 by an annular insulator 46 disposed within openings in the conductive cylinder through which the rivets 44 pass. The first layer of insulation 38 is composed of a plurality of axially aligned and bonded insulation rings 48 each having an outwardly extending flange 50. The second layer of insulation is composed of a plurality of axially aligned and bonded insulation rings 52 each having an inwardly extending flange 54. When the insulation rings 48 and 52 are bonded to each other they define a recess between flanges in which the conductive rings 36 and 40, respectively, are received. FIG. 2 shows a cross-section of the casing joint 32 taken through a rivet 44 at 2—2 of FIG. 1 to more clearly illustrate the alternate conductive and insulating layers of the casing joint 32. The first and second layers of insulation 38 and 42 may be prefabricated in the form of sleeves with the conductive rings 36 and 40 set therein and the sleeves then bonded or cemented to the conductive cylinder 34. Explosion type rivets may then be inserted through the conductive cylinder 34 to provide the necessary electrical contact between the conductive rings 36 and 40.

In order to make a resistivity log of subsurface formations the exploring unit 20 of the electrical logging system is lowered through the borehole 10 within the casing 16 containing a relatively conductive liquid capable of providing electrical contact between the electrodes 22 and 24 of the exploring unit 20 and the inner conductive rings 40 of the casing joint 32. The logging system will indicate a constant or zero value of resistivity while the exploring unit 20 is moving through electrically conductive casing above the section 32 since the short circuiting effect of a metallic, for example, steel, casing, provides an equipotential surface or barrier between the potential or pick-up electrode 24 and the subsurface formations regardless of the resistivity value of the subsurface formation behind the casing 16. When the exploring unit 20 is within the casing joint 32 the equipotential barrier will disappear since the current from the current electrode 22 of the exploring unit 20 will now pass into the formations through one or more of the ring arrangements to a distant return or ground electrode, such as indicated at the surface equipment 30, rather than flow within the conductive steel casing. The potential electrode 24 of the exploring unit 20 will then pick up voltages through one or more of the ring arrangements which are a function of the resistivity of the formations behind the casing joint 32 in the vicinity of the exploring unit 20.

It can be readily seen that each of the ring arrangements carries some current but because the ring arrangements are out of electrical contact with each other they do not establish an equipotential surface normally established by conventional steel casing. It has been found that in order to avoid serious distortion of current flow lines and equipotential lines in the neighborhood of the casing joint 32 the conductive areas of the casing joint 32 in contact with the conductive fluid within the casing section 32 and with the subsurface formations without the casing section 32 should be relatively large compared to the areas of the insulating space between the conductive areas. Thus, it has been found that the areas of the conductive rings 36 to 40 should be 3 to 32 times the area of the insulating spaces between the conductors, four times having been found to be very acceptable. A suitable width of each of the metallic conductive rings 36 and 40 may be 4 inches and of the insulation therebetween, 1 inch. The dimensions of the conductive and insulating areas may be varied depending on the amount of distortion which may be tolerated. When it is desired to locate the oil-water contact or interface 14, a considerable amount of distortion may be tolerated since the resistivity of the oil varies substantially from that of salt water in a producing formation.

Although the invention has been described hereinabove in some detail in connection with a casing joint 32 which has a conductive cylinder 34 passing through the entire length of the casing joint 32, the invention is not limited to this specific embodiment.

As shown in FIG. 3, the casing of this embodiment of the invention may be composed of alternate cylindrical members of a conductive material and of an insulating material, respectively, joined or bonded together at the ends thereof to form a tubular casing joint through which an electrical log of subsurface formations may be obtained. The casing joint of this embodiment shown in part in FIG. 3 is composed of a steel cylinder 56 having external threads at one end thereof and an insulating cylinder 58 having internal threads at one end thereof. The opposite ends of the steel and insulating cylinders 56 and 58 are bonded to each other to form a composite unit. By joining a plurality of these units a casing joint of any length may be provided which is substantially electrically invisible so as not to appreciably distort flow lines and equipotential lines in the vicinity thereof.

Still another embodiment of the invention is illustrated in FIG. 4 of the drawing. In this embodiment the casing comprises a cylindrical member 60 made of any suitable insulating material. First electrically conductive rings 62 surround the outside surface of the cylindrical member 60 and second electrically conductive rings 64 are disposed concentrically within the cylindrical member 60 and one or more rivets 66 electrically interconnect each of the first rings 62 to a corresponding second ring 64.

It should be understood that the conductive cylinder 34 of the casing joint 32 may be a conventional steel casing joint and the insulation material may be any suitable insulation material which can withstand high temperatures and shock, is abrasion resistant and has high electrical resistance so as to avoid excessive leakage between the conductive fluid within the casing and the subsurface formations and the conductive cylindrical members extending longitudinally of the casing joint 32. An insulation material which has been found suitable for oil production apparatus consists essentially of glass cloth bonded with a polymerized epoxy resin matrix prepared from glycidyl polyether which may incorporate powdered silicon carbide or Carborundum in relative proportions of 60 to 400 parts by weight silicon carbide per 100 parts by weight epoxy resin and 20 to 30 parts curing agent, the particle size of silicon carbide being in the range from 200 to 325 mesh, Tyler Standard Screen Scale. This glass cloth-epoxy resin insulating material may be used as the insulation material for any of the insulating elements disclosed hereinabove.

Accordingly, it can be seen that the present invention provides a well casing which includes means for conducting electricity across it throughout any desired length, but does not conduct electricity longitudinally, and, therefore, provides a casing through which substantially any electrical log may be obtained of subsurface formations lined thereby. Such an electric log is of particular use when perforating the casing of a well to determine more accurately the location at which bullets are to be fired.

It has been stated hereinabove that the casing 16 contains a conductive fluid to electrically connect the electrodes 24 and 26 of the exploring unit 20 to the inner rings 40, however, it should be understood that scratcher electrodes of the type disclosed in U.S. Patents Nos. 2,233,420 and 2,288,884 may be used to contact the inner rings 40 when the casing 16 contains a non-conductive fluid.

Obviously, many modifications and variations of the invention as hereinabove described may be made without departing from the spirit and scope thereof and therefore only such limitations should be made as are indicated in the appended claims.

I claim:

1. A well casing comprising an electrically conductive tubular member and means for transmitting electric energy transversely through said member but incapable of transmitting electric energy longitudinally thereof, said means comprising a plurality of longitudinally spaced electrically conductive first rings externally disposed around said tubular member, a plurality of longitudinally spaced electrically conductive second rings disposed concentrically within said tubular member and adjacent to said first rings, means for electrically insulating both said first and second rings from said tubular member, and means insulated from said conductive tubular member for electrically interconnecting each of said first rings to an adjacent one of said second rings.

2. A well casing comprising an electrically conductive tubular member and means for transmitting electric energy transversely through said member but incapable of transmitting electric energy longitudinally thereof, said means comprising a plurality of longitudinally spaced electrically conductive first rings externally disposed around said tubular member, a first insulating sleeve disposed between said rings and said member, a plurality of longitudinally spaced electrically conductive second rings disposed concentrically within said tubular member adjacent to said first rings, a second insulating sleeve disposed between said second rings and said tubular member, and means insulated from said conductive tubular member for electrically interconnecting each of said first rings to an adjacent one of said second rings.

3. A well casing as set forth in claim 2 wherein said first insulating sleeve is composed of a plurality of insulating cylinders each having an outwardly extending flange and disposed in axial alignment so as to define a recess between adjacent flanges in which one of said plurality of first rings are received and wherein said second insulating sleeve is composed of a plurality of insulating cylinders each having an inwardly extending flange, and disposed in axial alignment so as to define a recess between adjacent flanges thereof in which one of said plurality of second rings are received.

4. A well casing as set forth in claim 2 wherein said first and second insulating sleeves consist essentially of glass cloth, by weight, 100 parts epoxy resin, 20 to 30 parts curing agent, and 60 to 400 parts Carborundum filter.

5. A well casing as set forth in claim 3 wherein the spacing between the conductive rings is in the range of ⅓ to ¹⁄₃₂ of the axial width of said rings.

6. A well casing comprising a non-conductive tubular member, a plurality of first electrically conductive rings disposed around the external periphery of said tubular member, a plurality of second electrically conductive rings disposed concentrically within said tubular member adjacent to said first rings, and means for electrically interconnecting each of said first rings with an adjacent one of said second rings, said rings being longitudinally spaced so as to provide an area between rings in the range of ⅓ to ¹⁄₃₂ times the area of one of the rings.

References Cited in the file of this patent

UNITED STATES PATENTS

| | | |
|---|---|---|
| 2,096,359 | Hawthorn | Oct. 19, 1937 |
| 2,776,563 | Holbert | Jan. 8, 1957 |
| 2,809,699 | Battle | Oct. 15, 1957 |